May 20, 1947. W. REISE 2,420,980
TONGS
Filed Aug. 7, 1944
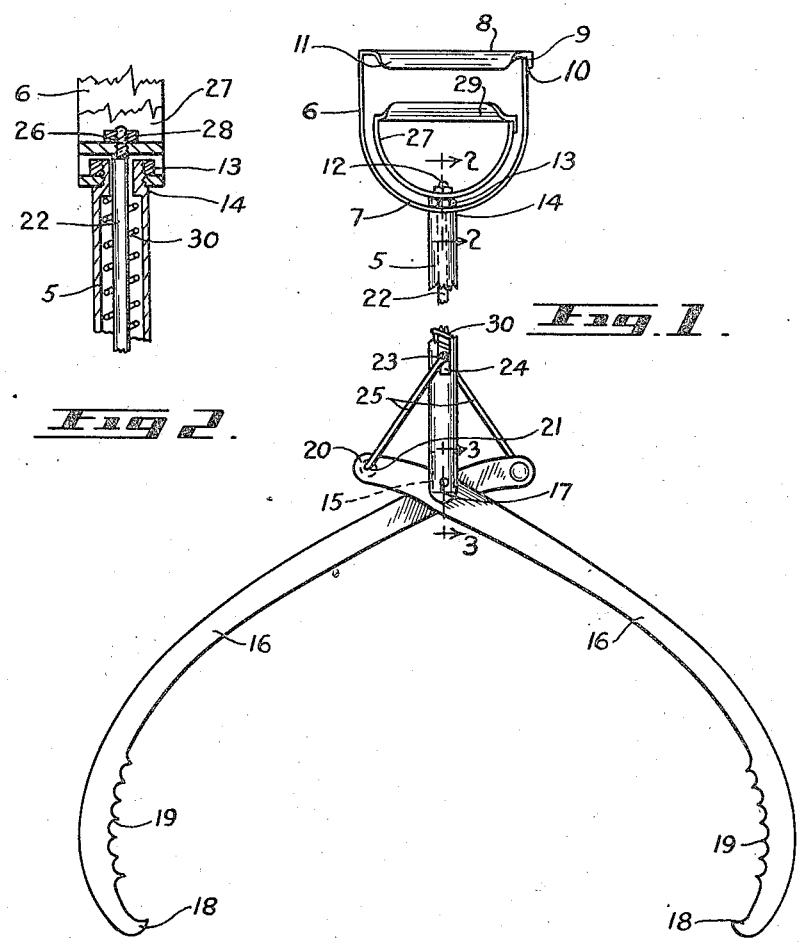
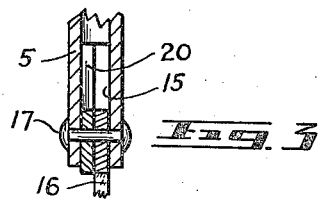
Inventor
WILLIAM REISE Patented May 20, 1947

2,420,980

UNITED STATES PATENT OFFICE 2,420,980

TONGS

William Reise, Ottawa, Ontario, Canada

Application August 7, 1944, Serial No. 548,427
In Canada July 24, 1944

3 Claims. (Cl. 294—115)

My present invention relates to improvements in tongs and appertains particularly to such a tool or implement wherein the pair of jaws are closed by squeezing together two hand grips held in the one hand.

An object of the invention is to provide a pair of tongs, suitable for quickly grasping and securely holding an object between the toothed jaws thereof, wherein the jaws are pivotally connected to a handle part with their upper, crossed ends connected with and operable by movement of an auxiliary handle relative to the said handle part.

A further object of the invention is to provide a pair of tongs for use by fishermen, in place of a gaff, landing-net or the like, having spring-opened jaws that may be snapped shut easily and quickly while held in one hand.

A still further object of the invention is the provision of tongs of simple and compact design, sturdy construction and neat appearance that open and close quickly, grasp securely and operate easily and dependably.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is an elevation of a preferred embodiment of the invention;

Figure 2 is a sectional detail of the handle and stem assembly as taken on line 2—2 of Figure 1; and Figure 3 is a section on the line 3—3 of Figure 1.

This novel and improved grasping and lifting implement of the tongs or grapple type comprises a handle consisting of a hollow tube or stem 5 and a hand grip 6 on one end thereof. The hand grip is here shown as made from a single strip of metal arced at the bottom 7 and straight across the top 8 with an end 9 thereof bent down and welded to the top of the side as at 10. The upper surface of the straight top 8 is rounded downwards transversely as at 11. The centre of the arced bottom 7 is drilled to accommodate the threaded, reduced end 12 of the tube or stem 5 on which a nut 13 is tightened to secure the hand grip 6 against the exterior shoulder 14 of the tube.

The opposite or lower end of the stem 5 is slotted with diametrically opposite cuts 15 to accommodate the crossed jaws 16 that are pivoted therein by a transverse pin 17, their outer ends terminating in an inturned tooth 18, their confronting curved sides being suitably notched as at 19 and their upper ends 20, beyond the pivot 17, being each provided near the end, with a perforation 21.

Slidable longitudinally within the stem 5 is an axial rod 22 with a pin 23 extended transversely therethrough near its lower end, to accommodate which are vertical slots 24 cut in opposite sides of the said stem 5 and spaced in from the end thereof and disposed at right angles to the cuts 15 and on the ends of which pin 23 links 25 attach that connect with the respective upper ends 20 of the jaws 16 by being bent at right angles and terminally provided with rivet heads.

On the upper end 26 of the rod 22, that is of reduced diameter and threaded, is a second or inner handle grip 27, substantially the same design and shape as the outer handle grip 6 that surrounds it and perforated on its bottom to receive the said threaded upper end 26, that is securely fastened against the shoulder on the rod by a nut 28. The cross bar or straight top 29 of this inner handle grip 27 is rounded upwards transversely thus forming a comfortable grip in conjunction with the downwardly rounded outer handle 6, the both of which are embraced in the one hand.

To complete the tongs, a coil spring 30 surrounding the rod 22 is compressed between the transverse pin 23 and the interior shoulder at the top of the stem 5 operating to force the rod 22, inner handle grip 27 and the links 25 attached to the pin 23 downwards normally to keep the jaws wide open and available for instant use at all times.

For carrying or storing the tongs, I propose a long narrow bag or sheath (not shown) just wide enough to accommodate the tongs when the jaws are closed. Thus, if the tongs are shut and inserted in the bag, opening slightly under the action of the strong, fast acting coil spring 30, their outer edge will expand to bear against the inside of the bag securely holding the tongs encased.

From the foregoing description taken in connection with the accompanying drawings, it will be manifest that tongs are provided that will fulfil all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawings shall be interpreted as illustrative and not in a limitative or restrictive sense.

Having thus described my invention, what I claim as new and desire to secure by Letters Patent is:

1. Tongs comprising: a hollow stem, a shoulder formed near the upper end thereof and a reduced threaded part rising therefrom, a rod slidably mounted in said stem and having a shoulder formed near the upper end thereof and a reduced threaded part rising therefrom, a pair of handle grips mounted respectively on said reduced threaded parts at the upper ends of said stem and rod and secured thereto, slots formed at the lower end of said stem and extending inwardly therefrom, a pair of crossed jaws disposed in said slots and pivoted to said stem, teeth on the confronting faces of the outer free ends of said jaws, links pivoted to the inner ends of said jaws above the pivot mounting thereof, a transverse pin connected to said rod and to which said links are connected, a pair of oppositely disposed slots formed in said stem in which said pin may slide, and a coil spring disposed within said stem, surrounding said rod and compressed between the shoulder at the upper end of said stem and the transverse pin connected to said rod.

2. Tongs comprising: a hollow stem, a shoulder formed near the upper end thereof and a reduced threaded part rising therefrom, a rod slidably mounted in said stem and having a shoulder formed near the upper end thereof and a reduced threaded part rising therefrom, a pair of nested handle grips mounted respectively on said reduced threaded parts at the upper ends of said stem and rod and secured thereto, the outer handle grip being the one secured to said stem and having its top rounded downwardly and the inner handle grip having its top rounded upwardly, slots formed at the lower end of said stem and extending inwardly therefrom, a pair of crossed jaws disposed in said slots and pivoted to said stem, teeth on the confronting faces of the outer free ends of said jaws, links pivoted to the inner ends of said jaws above the pivot mounting thereof, a transverse pin connected to said rod and to which said links are connected, a pair of oppositely disposed slots formed in said stem in which said pin may slide, and a coil spring disposed within said stem, surrounding said rod and compressed between the shoulder at the upper end of said stem and the transverse pin connected to said rod.

3. Tongs comprising: a hollow stem, a shoulder formed near the upper end thereof and a reduced threaded part rising therefrom, a rod slidably mounted in said stem and having a shoulder formed near the upper end thereof and a reduced threaded part rising therefrom, a pair of handle grips mounted respectively on said reduced threaded parts at the upper ends of said stem and rod and secured thereto, slots formed at the lower end of said stem and extending inwardly therefrom, a pair of crossed jaws disposed in said slots and pivoted to said stem, teeth on the confronting faces of the outer free ends of said jaws, links pivoted to the inner ends of said jaws above the pivot mounting thereof, a pair of oppositely disposed vertical slots formed in said stem a distance spaced in from the lower end thereof and at right angles to said first mentioned slots, a transverse pin extended transversely through said rod whose opposite ends project through and may slide in said pair of slots and to which ends of said pin said links are connected; and a coil spring disposed within said stem, surrounding said rod and compressed between the shoulder at the upper end of said stem and the transverse pin connected to said rod.

WILLIAM REISE.

REFERENCES CITED

The following references are of record in the file of this patent:

UNITED STATES PATENTS

| Number | Name | Date |
| --- | --- | --- |
| 2,193,073 | Norton | Mar. 12, 1940 |
| 1,482,366 | Neller | Jan. 29, 1924 |
| 855,123 | McNabb et al. | May 28, 1907 |
| 1,018,065 | Marble | Feb. 20, 1912 |
| 1,220,899 | Sorensen | Mar. 27, 1917 |
| 1,415,143 | Briddell | May 9, 1922 |
| 1,642,639 | Born | Sept. 13, 1927 |